(12) United States Patent
Kaufman

(10) Patent No.: US 6,362,534 B1
(45) Date of Patent: Mar. 26, 2002

(54) APPARATUS AND METHOD FOR EXTRACTING ENERGY FROM A PASSING TRAIN

(76) Inventor: William M. Kaufman, 38 Sheridan Rd., Swampscott, MA (US) 01907

( * ) Notice: Subject to any disclaimer, the term of this patent is extended or adjusted under 35 U.S.C. 154(b) by 0 days.

(21) Appl. No.: 09/644,730

(22) Filed: Aug. 23, 2000

Related U.S. Application Data

(60) Provisional application No. 60/150,779, filed on Aug. 26, 1999.

(51) Int. Cl.[7] ............................................. H02P 9/04
(52) U.S. Cl. ................................................... 290/1 R
(58) Field of Search ........................... 290/1 R; 60/325, 60/413; 41/332; 185/27; 104/154, 155

(56) References Cited

U.S. PATENT DOCUMENTS

| | | | | |
|---|---|---|---|---|
| 565,429 A | * | 8/1896 | Chaquette | 417/229 |
| 1,916,873 A | * | 7/1933 | Wiggins | 185/39 |
| 3,559,027 A | | 1/1971 | Arsem | |
| 4,115,034 A | * | 9/1978 | Smith | 417/231 |
| 4,130,064 A | * | 12/1978 | Bridwell | 104/154 |
| 4,173,431 A | * | 11/1979 | Smith | 417/229 |
| 4,211,078 A | * | 7/1980 | Bass | 60/413 |
| 4,238,687 A | | 12/1980 | Martinez | |
| 4,239,975 A | * | 12/1980 | Chiapetti | 290/1 R |
| 4,614,875 A | | 9/1986 | McGee | |
| 4,700,540 A | * | 10/1987 | Byrum | 60/325 |
| 4,739,179 A | * | 4/1988 | Stites | 290/1 R |
| 4,980,572 A | | 12/1990 | Sen | |
| 5,355,674 A | | 10/1994 | Rosenberg | |
| 6,204,568 B1 | * | 3/2001 | Runner | 290/1 R |

FOREIGN PATENT DOCUMENTS

| WO | 8607504 | * 12/1986 |
|---|---|---|

* cited by examiner

*Primary Examiner*—Joseph Waks
(74) *Attorney, Agent, or Firm*—Banner & Witcoff, Ltd.

(57) ABSTRACT

A system for extracting energy from the passing wheels of a railcar, converting the energy to into rotation of a shaft in first and second directions, converting the rotation of the shaft into electrical energy, and storing any excess generated electricity. A pivoting member includes a shaft, first and second arms extending from the shaft, and contact elements at the ends of the arms. The vertical reaction force imparted to the wheels of a passing railcar may be minimized by, among other techniques, orienting the pivoting member so that the contact elements move in a horizontal plane and by coupling the contact elements to the ends of the pivoting member arms via respective journal bearings.

25 Claims, 6 Drawing Sheets

APPARATUS AND METHOD FOR EXTRACTING ENERGY FROM A PASSING TRAIN

CROSS REFERENCE TO RELATED APPLICATION

This application claims the benefit of the Aug. 26, 1999 filing date of copending provisional application serial No. 60/150,779, the disclosure of which is incorporated herein by reference.

BACKGROUND OF THE INVENTION

Many techniques have been described by others to extract energy from moving vehicles. See, for example, UK Patent No. 1,332,202 and U.S. Pat. Nos. 4,130,064, 4,238,687, 4,614,875, 4,980,572, and 5,355,674. The methods disclosed by these references involve a vehicle riding over and depressing a treadle or ramp or similar lever because of the weight and momentum of the vehicle. The forced movement of the treadle is then converted into electrical energy by either mechanical linkages or gears coupled to flywheels and/or electrical generators or by pistons or other fluid pumps that drive fluid through a hydraulic motor. The hydraulic motor may be used to rotate an electrical generator or drive some mechanical actuator.

These methods typically impart a significant vertical component of force to the vehicle wheels. Those methods that make no effort to limit this vertical force cause, at least, a bumpy ride or, at worst, an accident due to the dynamic interaction of the vehicle with the vertical forces exerted by the treadle. Many of these inventions incorrectly state or imply that the energy extracted from the moving vehicle is, in some way, a conversion of otherwise unused or wasted energy. All of the methods that extract energy from the moving vehicle must introduce a force that retards the vehicle. Those inventions that recognize this suggest that the invention only be used in locations where the vehicle would otherwise have to apply brakes. Thus some of the retarding energy is utilized instead of being wasted.

One method, which is disclosed in U.S. Pat. No. 4,700, 540 ("the '540 patent"), is designed for railroad applications and creates a fluid pumping action by having the flanges of the wheels successively compress a collapsible tube (roller pump) in a closed-loop hydraulic system. The '540 patent states that the tube walls and a fluid accumulator should be designed to exert a safe limit of vertical reaction force. The '540 patent, however, does not provide the magnitude of this limit. The collapsible tube may be compressed by a train coming from either direction because the proposed system includes a bi-directional valve, which must be operated by an approaching train closing one of two switches (one for each direction) so that the system can operate properly. The '540 patent proposes that such changes as increasing the wheel flange heights by one or two inches would improve performance. However, such a change would have a major economic impact on railroads because of the cost of changing the many wheel sets that are currently in use. For example, in the United States there are about eight million railroad wheels that would have to be replaced.

Known methods proposed by others require a means, such as a spring that is compressed by the action of the vehicle on the treadle (or tube wall) or a weight that is lifted by that action, to provide a restoring force to reset the treadle (or tube wall) to its initial operating position. These methods all store a portion of the energy removed from the vehicle in the form of potential energy and then use that portion of stored energy to reset the device. These means for resetting the device using stored energy require the use of components that complicate the design and increase the likelihood of system failure.

PURPOSES AND SUMMARY OF THE INVENTION

A purpose of this invention is to reduce the vertical dynamic reaction force exerted by an energy converter on railroad vehicles while extracting energy from passing trains. Reduction of this vertical reaction force reduces the probability of an accidental derailment.

Another purpose of this invention is to eliminate the need to store some of the extracted energy for resetting the energy converter system after the passage of each wheel. According to an aspect of this invention, passage of a vehicle wheel is utilized to perform the resetting of the energy conversion system.

It is a further purpose of this invention to provide railroads with a system for extracting energy from a moving train that does not require substantial modification to existing railroad equipment.

An energy extractor in accordance with the principles of the invention may include a pivoting member composed of two elements that are contacted by a railroad wheel as the wheel passes. The pivoting member will be moved from its initial position to a second position as the railroad wheel contacts the first element and then is returned to its initial position as the wheel contacts the second element and passes beyond it. This pivoting motion, which is forced by the passing wheel, may be converted into useful electrical or mechanical energy by any one or more of the many possible means that are well known.

The pivoting member may be disposed to rotate in a horizontal plane, a vertical plane, or in any other plane of rotation that is found to be desirable. Preferably, the pivoting member is disposed in a horizontal plane. In such a configuration, the contact elements preferably reduce the vertical reaction force on each wheel by permitting each contact element to rotate about a horizontal axis. In this way, vertical motion of the rim of the wheel merely rotates the contact member while the wheel exerts a lateral force to push aside the contact member.

Depending upon the desired amount of energy to be extracted from the moving train, a multiplicity of pivoting members may be utilized by placing the pivoting members sequentially along the track. The extraction of energy from the train causes a retarding force to be exerted against each wheel as it is in contact with a pivoting member. For safety considerations, it is preferable to use the same number of pivoting members and associated energy conversion means on each of the two rails. In this way, both wheels of each axle will contact the pivoting members at substantially the same time, thereby minimizing any unbalance of forces that would otherwise tend to skew the axle.

There are regions of railroad track that do not have access to electrical power because they are far from electrical utility lines. Such regions are called "dark territory" in railroad parlance. Motorists at road crossings at grade in dark territory are alerted to the presence of railroad tracks by a static sign, usually in the form of an X (crossbuck), that says "Railroad Crossing." Such signs have been found to be virtually ineffective in preventing accidents. A study by the Federal Railroad Administration, "Safety of Highway-Railroad Grade Crossings, Vol. II. January, 1996, DOT-VNTSC-FRA-95-12.2," found that the crossbuck sign is approximately only one-one hundredth as effective as a flashing warning light in reducing the potential of a grade crossing accident. Gates are more than one thousand times more effective than a crossbuck sign. This report found that the crossbuck sign is barely more effective than nothing at all. If energy extracted from a passing train were used to operate some sort of active warning devices, such as flashing lights, then there may be a significant reduction in the probability of accidents at grade crossings in dark territory.

Additional features and advantages of the invention will be apparent upon reviewing the following detailed description.

DETAILED DESCRIPTION OF THE INVENTION

Various inventive aspects will be described in connection with FIGS. 1–8 in which like parts are depicted with like reference numbers.

Figure 1:
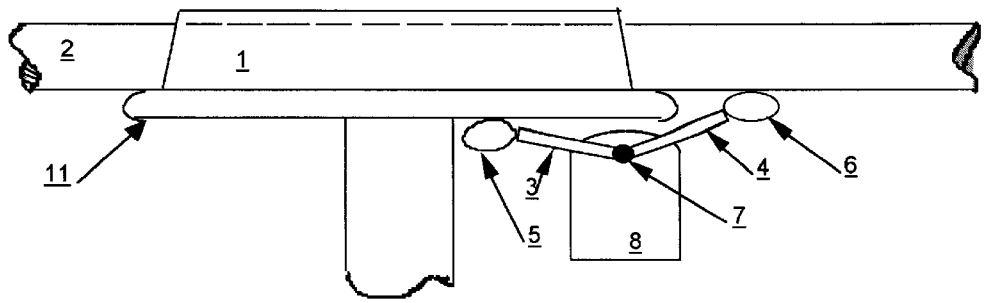
FIG. 1 depicts a system for extracting energy from a passing railcar wheel in accordance with certain inventive principles.
Figure 8:
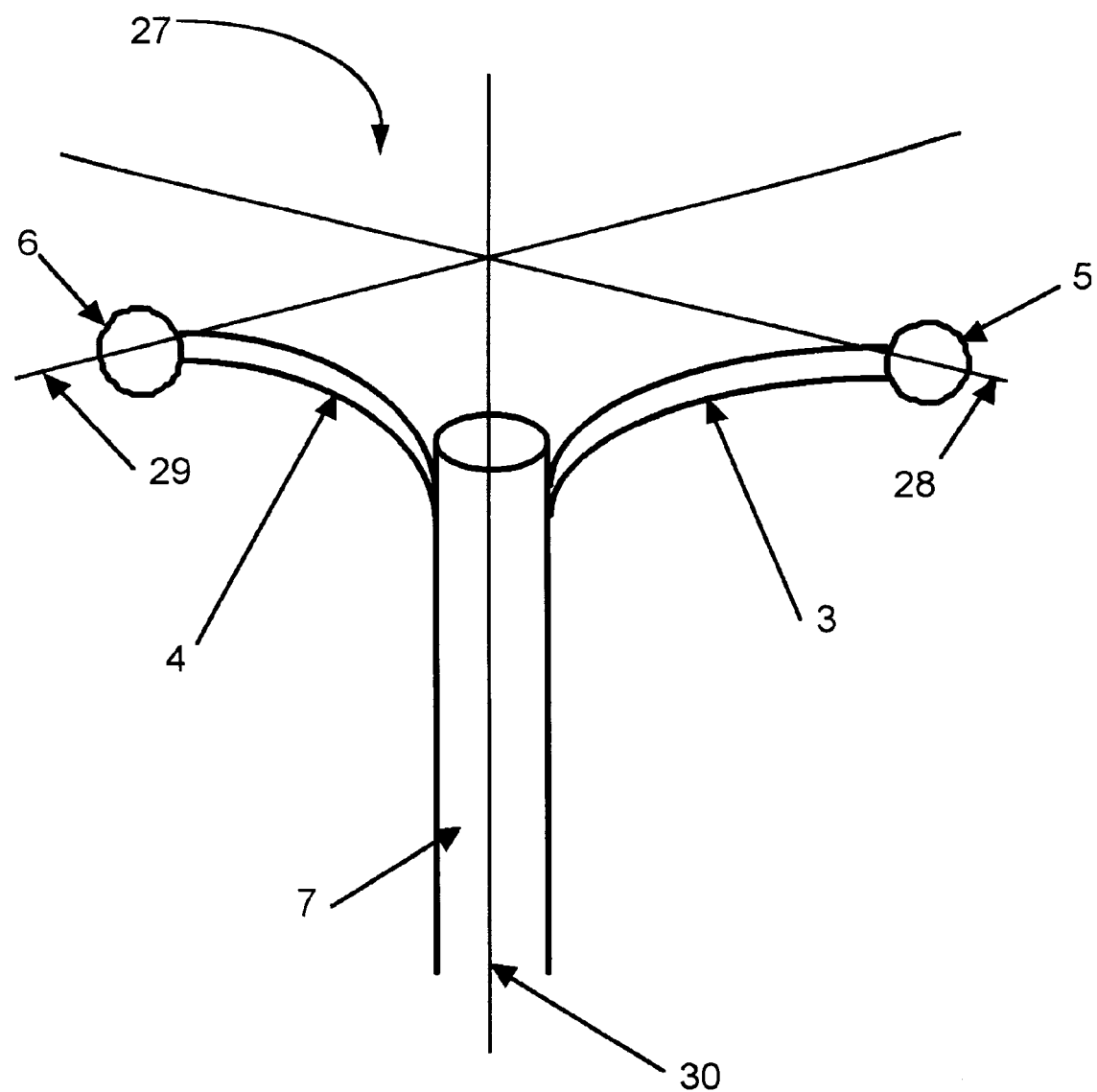
FIG. 8 depicts a pivoting member in accordance with certain inventive principles.

A preferred embodiment of the invention is depicted in FIG. 1, which shows railroad wheel 1 riding on the head of rail 2. Wheel 1 has encountered an energy extraction device in accordance with certain inventive principles. The energy extraction device includes a pivoting member, comprising arms 3 and 4, contact elements 5 and 6, and shaft 7. Referring to FIG. 8, pivoting member 27 is depicted in accordance with certain inventive principles. Longitudinal axes 28 and 29 define a plane in which contact elements 5 and 6 on arms 3 and 4, respectively, may rotate about shaft 7. Arms 3 and 4 may have any convenient shape such that the arms 3 and 4 allow the contact elements 5 and 6 to alternately contact the side of the head of the rail. Longitudinal axis 30 of shaft 7 is preferably substantially perpendicular to the plane of rotation defined by axes 28 and 29. Referring again to FIG. 1, the energy extraction device is depicted therein connected to conversion device 8. Conversion device 8 may be used to convert the pivoting motion of pivoting member 27 into a useable form of energy as described in more detail below.

As depicted in FIG. 1, contact elements 5 and 6 are mounted on the ends of arms 3 and 4 of the pivoting member. Shaft 7 of the pivoting member connects the pivoting member to conversion device 8 such that shaft 7 is substantially perpendicular to the plane in which contact elements 5 and 6 of the pivoting member rotate, also referred to as the plane of rotation of the pivoting member. Shaft 7, therefore, rotates first in one direction, for instance, counter-clockwise with reference to FIG. 1, and then in the other direction, for instance, clockwise with reference to FIG. 1, as a result of the passage of railroad wheel 1 from left to right in FIG. 1. Shaft 7 may serve as a drive shaft for any desired energy conversion performed by energy converter 8.

Figure 2:
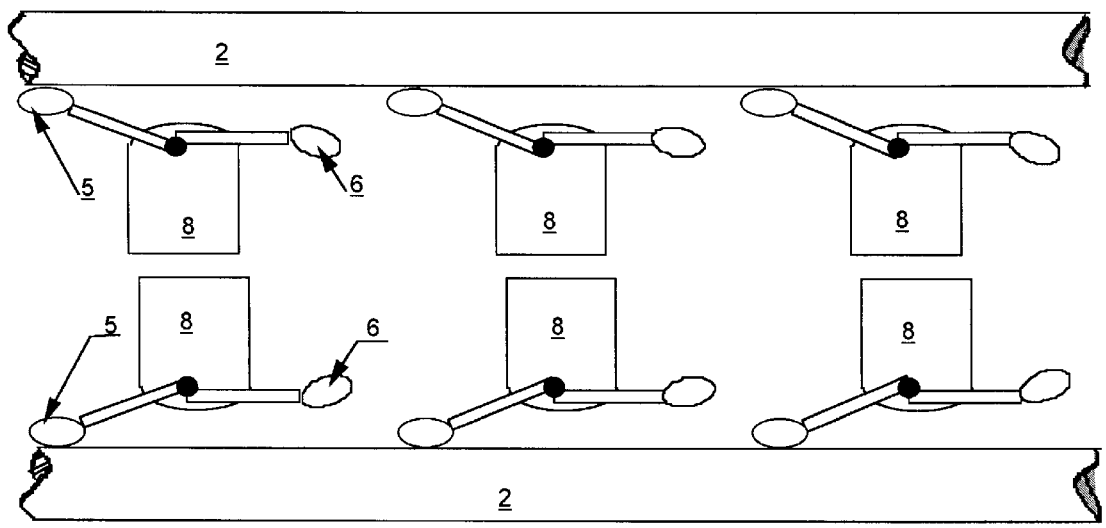
FIG. 2 depicts a plurality of energy extracting devices positioned in close proximity to railroad rails.

If it is desirable to extract more energy from a train than can be accomplished using one pair of energy extractors (one on each rail), additional pairs of extractors can be placed along the track, as depicted in FIG. 2.

Figure 3:
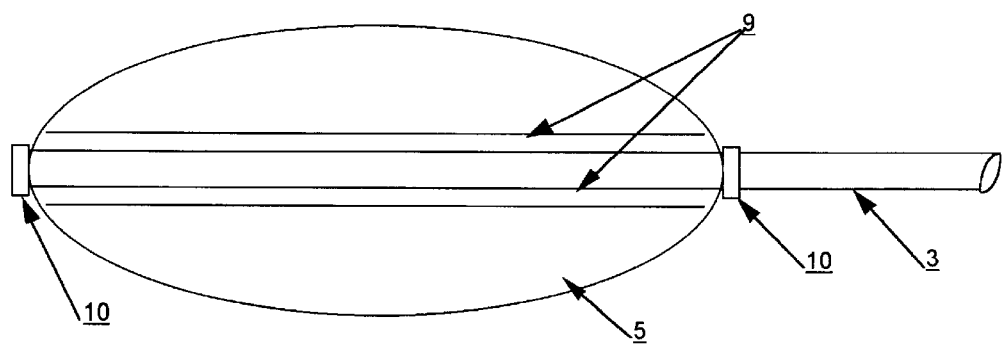
FIG. 3 is a detailed view of a contact element for contacting a passing railcar wheel in accordance with certain inventive principles.

Contact elements 5 and 6 are mounted on arms 3 and 4 in such a way that each contact element may turn or rotate freely around the end of the arm to which it is attached. As shown in FIG. 3, bearing 9, which may be a journal bearing, may be used to mount contact element 5 to arm 3 so that substantially no significant vertical component of force can be transmitted from the arm 3 to wheel flange 11. As will be apparent, contact element 6 may be mounted to arm 4 in a similar manner. The vertical component of motion of wheel flange 11, therefore, results in rotation of contact elements 5 and 6 about arms 3 and 4, respectively. In FIG. 3, collars 10 prevent contact element 5 from falling off of arm 3. As will be apparent, contact elements 5 and 6 may be constrained from falling off their respective supporting arms by any other suitable means.

According to certain inventive principles depicted in FIG. 1, if wheel 1, approaches from left to right, as wheel flange 11 encounters contact element 5, wheel flange 11 pushes aside contact element 5 thereby rotating the pivoting member in a counter-clockwise direction with reference to FIG. 1. Arms 3 and 4 of pivoting member 27 are long enough so that wheel flange 11 can touch only one of contact elements 5 and 6 at any particular time. As wheel flange 11 leaves contact with first contact element 5 and encounters second contact element 6, pivoting member 27 is rotated back to its original position as wheel flange 11 pushes aside, in a direction away from rail 2, second contact element 6. If the next train approaches from right to left, then the first wheel to encounter the energy extractor will reset pivoting member 27 and each subsequent wheel will cause pivoting member 27 to rotate in both directions. No special switches are required to prepare the energy extractor for a train coming from either direction.

Figure 6:
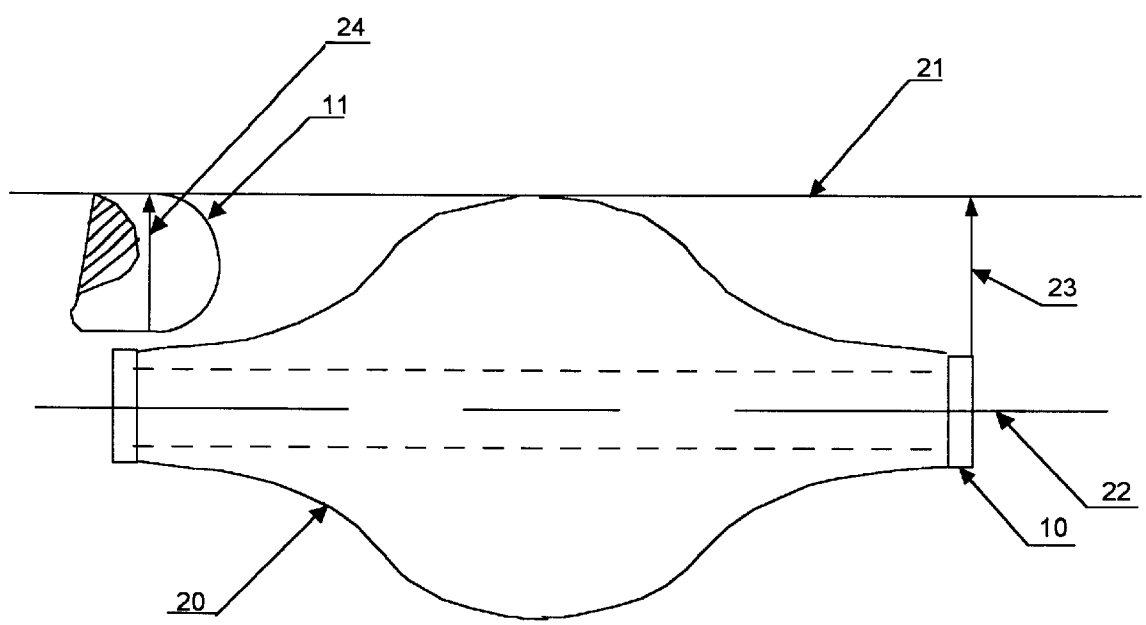
FIG. 6 depicts preferred dimensions of a contacting element relative to the width of a railcar wheel flange.

The shape of contact elements 5 and 6 may be selected so that wheel flange 11 will push a respective contact element and arm of pivoting member 27 aside, in a direction away from rail 2, rather than in any other direction. Contact elements 5 and 6 are preferably of circular cross section perpendicular to bearing 9 and the longitudinal axis through the end of arm 3. FIG. 6 shows contact element 20 in contact with gage face 21 of the railhead. Contact element 20 is a figure of rotation about centerline 22. In FIG. 6, wheel flange 11 is shown approaching contact element 20 from the left toward the right. The distance 23 between collar 10 at the end of contact element 20 and gage face 21 of the rail is preferably greater than the thickness 24 of wheel flange 11. Guide rails, the use of which is well known in the art, may also be used to assure that wheel flange 11 is in proper alignment with gage face 21 and contact element 20.

Figure 7:
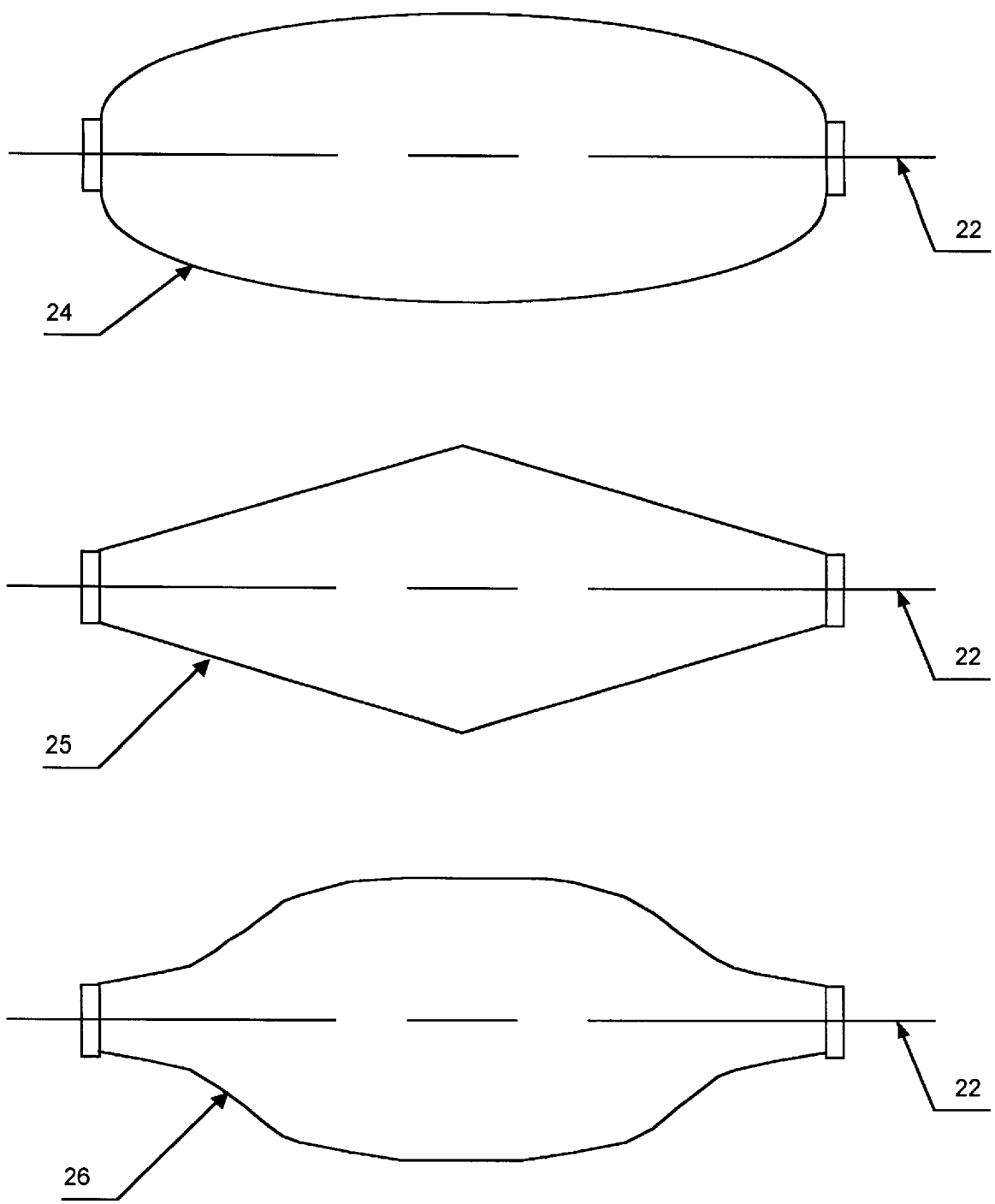
FIG. 7 depicts various preferred contact element shapes in accordance with certain inventive principles.

The shape of the surface of the contact elements may be varied but, in general, the radius of a contact element preferably starts small at the ends and grows larger toward the center of the contact element. For example, as shown in FIG. 7, the shape may be oval, 24, linear (conical) from end to center, 25, or s-shaped from end to center, 26, or may be other shapes with similar characteristics such that the wheel flange can push the pivoting member aside in a direction away from the rail. Each shape is shown in FIG. 7 as a figure of rotation about a centerline 22.

Figure 4:
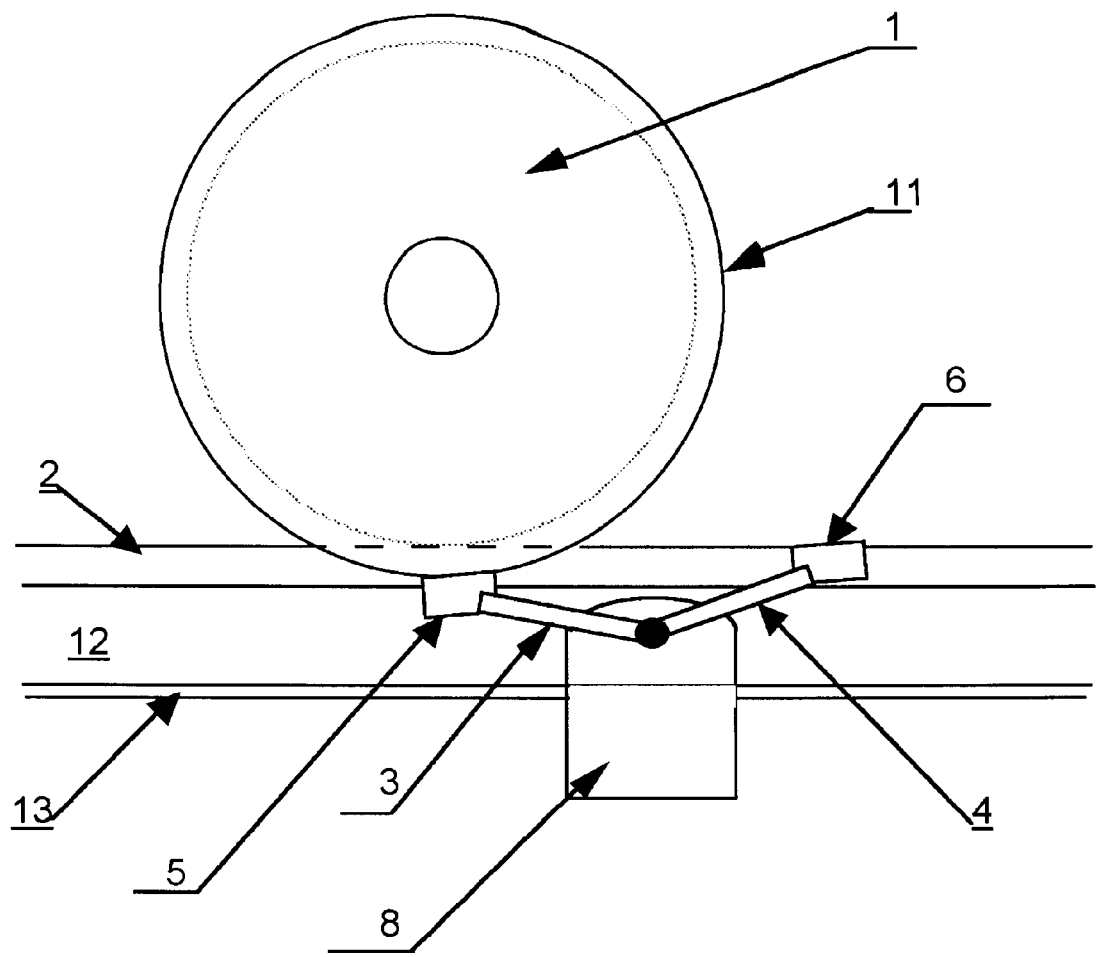
FIG. 4 depicts a system for extracting energy from a passing railcar wheel in accordance with certain inventive principles.

Another aspect of the invention is shown in FIG. 4. Wheel 1 rides on rail head 2. Rail web 12 and rail base 13 are also shown. In FIG. 4, pivoting member 27 is mounted such that arms 3 and 4 rotate in a vertical plane. Contact elements 5 and 6 and arms 3 and 4 are pushed down rather than aside, thus requiring less lateral space for the energy extraction device. The same two-directional pivoting action occurs as was previously described above. In this manner, a useful form of energy may be extracted from the train. An energy extractor configured as shown in FIG. 4 results in a vertical reaction force being exerted on wheel 1. For safety, this vertical reaction force should be maintained low enough so that derailment potential is minimal. The vertical reaction force on flange 11 results in a reduction of the vertical force at the wheel tread. A commonly used indicator of derailment potential is the ratio of the lateral force on the wheel to the vertical force on the wheel at the wheel—rail interface. This ratio is commonly called the L/V ratio. An increase in L/V ratio of no more than 0.1 for the lightest car in a train is preferably considered a safe limit on the increase of L/V.

For example, if an empty freight car weighs 50,000 lb., then one wheel will exert a vertical force of 6,250 lb. because there usually are eight wheels on a freight car. If $V_1$=vertical force at the wheel tread when the wheel is not in contact with the energy extractor and $V_2$=vertical force at the wheel tread when in contact with the energy extractor, and L is the lateral force at the tread, then $(L/V_2)/(L/V_1)=1.1$ may be considered the limit of the ratio. This equation reduces to $V_2=0.9\ V_1$. The reduction in vertical force at the tread is then $V_1-V_2=0.1\ V_1$ or 625 lb. The value of 625 lb. may be considered to be the upper limit on the value of the vertical reaction force that the energy extractor may safely exert against the wheel flange. This method of calculating the limit on the vertical reaction force also can be used if a railroad prefers a different limit on the allowable increase of the L/V ratio.

Figure 5:
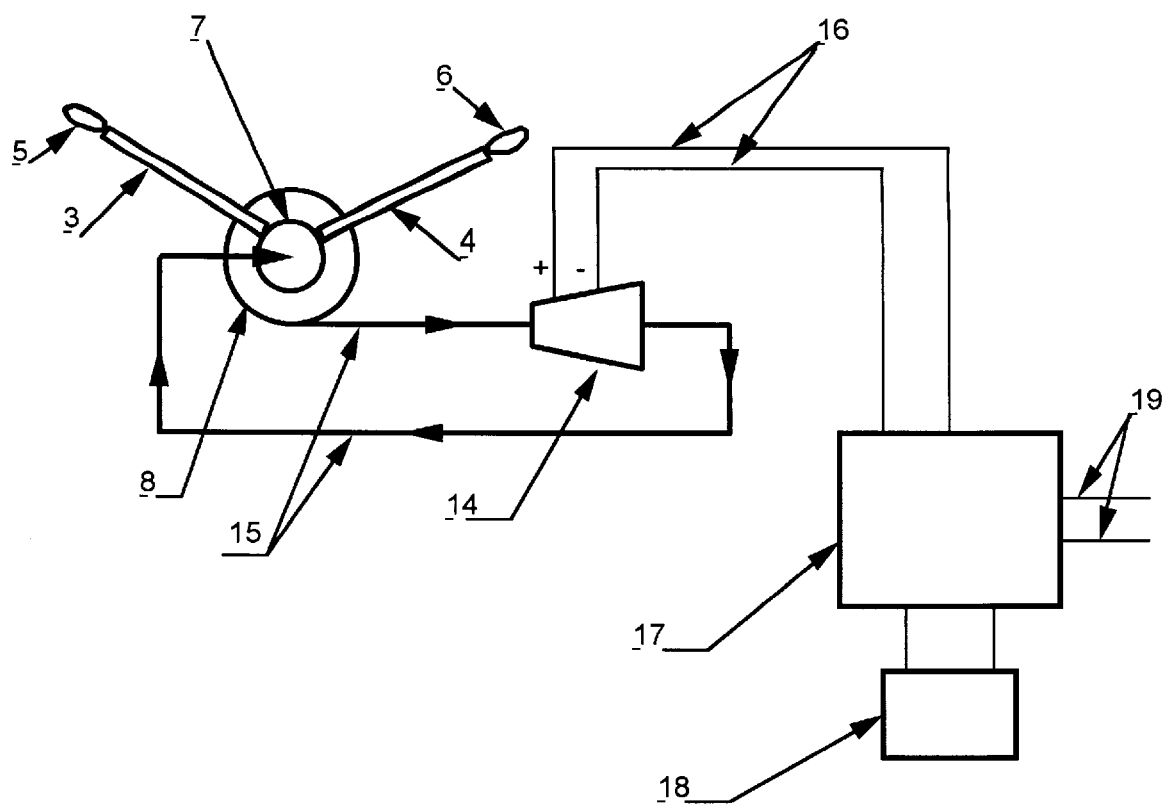
FIG. 5 depicts a system for converting extracted energy into electrical energy.

One means for converting the pivoting motion into electrical energy may be understood with reference to FIG. 5. In FIG. 5, the pivoting member, with its associated arms 3 and 4, contact elements 5 and 6, and shaft 7, is coupled to a conversion device 8 that converts the pivoting motion to useful energy through a unidirectional coupling, such as a ratchet. Conversion device 8 may include a hydraulic pump. The hydraulic pump may drive a combined hydraulic motor/electrical dynamo 14 by pumping hydraulic fluid to the hydraulic motor and receiving the flow from the outlet port of the motor by means of a closed hydraulic loop 15. The electrical output of the dynamo may be connected by a pair of wires 16 to a power conditioning circuit 17.

Power conditioning circuit 17 preferably provides smoothened and stable power to an electrical load (the end use of the extracted energy) that may be coupled to output lines 19. Power conditioning circuits are well known. They generally consist of such components as rectifiers, energy storage elements such as capacitors, current smoothing elements such as inductors, and voltage regulating circuits. In general, the function of the power conditioning circuit is to accept the pulsatile electrical energy from the passage of each wheel and provide as an output the average of the individual energy pulses.

Associated with power conditioning circuit 17 is storage battery 18. Storage battery 18 may also function to help smooth and stabilize the output voltage of the power conditioner and to provide energy when no trains are passing through the energy extractor system. Whenever more energy is extracted from the train than is needed by the electrical load, the excess energy may be stored in storage battery 18.

Various modifications may occur to others upon reading and understanding the foregoing detailed description. For example, energy extraction could also be accomplished by contacting the wheel tread on the field side (outside of the track) rather than by the flange. Under these circumstances, the contact elements could be positioned above the head of the rail. Because the wheel tread is wider than the rail head, the wheel will project beyond the railhead and can be used to deflect the contact elements in either a vertical, horizontal, or other desirable plane. The invention includes all modifications that may occur to others to the extent that they come within the scope of the appended claims or their equivalents.

I claim:

1. Apparatus for extracting energy from a passing railcar wheel that is traveling along a rail, the apparatus comprising:
    a pivoting member including a shaft, a first elongated arm, and a second elongated arm;
    the first arm including a first end coupled to the shaft and a second end coupled to a first contact element;
    the second arm including a first end coupled to the shaft and a second end coupled to a second contact element;
    the pivoting member being positioned such that the passing railcar wheel will push the first contact element aside laterally away from the rail thereby causing the pivoting member to rotate in a first direction around the shaft and then the passing railcar wheel will push the second contact element aside laterally away from the rail thereby causing the pivoting member to rotate in a second direction around the shaft, the second direction being different than the first direction.

2. The apparatus as in claim 1, wherein the first contact element and the second contact element move within a plane that is substantially perpendicular to the shaft.

3. The apparatus as in claim 1, wherein the pivoting member is adapted to exert a vertical reaction force upon the wheel of substantially no more than one sixteenth of an expected lightest weight of a passing railcar.

4. The apparatus as in claim 1, wherein the pivoting member is adapted to exert a vertical reaction force upon the wheel of substantially no more than one thirty-second of an expected lightest weight of a passing railcar.

5. The apparatus as in claim 1, wherein the pivoting member is adapted to exert a vertical reaction force upon the wheel of substantially no more than one sixty-fourth of an expected lightest weight of a passing railcar.

6. The apparatus as in claim 1, wherein the pivoting member is adapted to exert a vertical reaction force upon the wheel of substantially no more than one eightieth of an expected lightest weight of a passing railcar.

7. The apparatus as in claim 1, wherein the first contact element and the second contact element move within a substantially horizontal plane.

8. The apparatus as in claim 1, wherein the first contact element is coupled to the first arm via a first journal bearing and the second contact element is coupled to the second arm via a second journal bearing.

9. The apparatus as in claim 1, wherein:
    the pivoting member is positioned such that the first and second contact elements will contact a flange of the passing railcar wheel;
    a first distance between an end of the first contact element and a gage face of the rail is substantially greater than a thickness of the wheel flange; and a second distance between an end of the second contact element and the gage face of the rail is substantially greater than the thickness of the wheel flange.

10. The apparatus as in claim 1, wherein:
the first contact element has a plurality of generally circular cross-sections perpendicular to a longitudinal axis of the second end of the first arm, the cross-sections of the first contact element substantially increasing from respective ends of the first contact element toward a middle point of the first contact element, the ends and the middle point of the first contact element being defined relative to the longitudinal axis of the second end of the first arm; and
the second contact element has a plurality of generally circular cross-sections perpendicular to a longitudinal axis of the second end of the second arm, the cross-sections of the second contact element substantially increasing from respective ends of the second contact element toward a middle point of the second contact element, the ends and the middle point of the second contact element being defined relative to the longitudinal axis of the second end of the second arm.

11. The apparatus as in claim 1, further comprising:
a hydraulic motor operatively coupled to an electrical dynamo or generator for driving the electrical dynamo or generator;
a hydraulic pump; and
a unidirectional coupling for coupling the pivoting member to the hydraulic pump for pumping hydraulic fluid in a closed loop to the hydraulic motor.

12. The apparatus as in claim 11, further comprising:
a power conditioning circuit for smoothing and stabilizing electrical power generated by the electrical generator.

13. The apparatus as in claim 12, further comprising:
a battery coupled to the power conditioning circuit for storing the electrical power smoothed and stabilized by the power conditioning circuit.

14. A method of extracting energy from a passing railcar wheel, the method comprising the steps of:
positioning a first pivoting member in close proximity to a first railroad rail, the pivoting member including a shaft, first and second arms extending from the shaft, and first and second contact elements coupled to respective ends of the first and second arms;
pushing the first arm aside laterally away from the first railroad rail by contacting the first contact element with a passing railcar wheel such that the shaft rotates in a first direction; and
pushing the second arm aside laterally away from the first railroad rail by contacting the second contact element with the passing railcar wheel such that the shaft rotates in a second direction, the second direction being different than the first direction.

15. The method of claim 14 further comprising the step of:
positioning at least one additional pivoting member in close proximity to the first railroad rail.

16. The method of claim 14 further comprising the step of:
positioning a second pivoting member in close proximity to a second railroad rail such that, as a train passes the first and second pivoting members, respective contact elements of the respective pivoting members will be contacted at substantially the same time by first and second wheels coupled to a common railcar axle.

17. The method of claim 16 further comprising the steps of:
positioning a third pivoting member in close proximity to the first rail; and
positioning a fourth pivoting member in close proximity to the second railroad rail such that, as a train passes the third and fourth pivoting members, respective contact elements of the respective third and fourth pivoting members will be contacted at substantially the same time by first and second wheels coupled to a common railcar axle.

18. The method of claim 14 further comprising the step of:
limiting the vertical reaction force imparted by the pivoting member to the wheel to substantially less than one-sixteenth of an expected lightest weight of a passing railcar.

19. The method of claim 14 further comprising the step of:
limiting the vertical reaction force imparted by the pivoting member to the wheel to substantially less than one thirty-second of an expected lightest weight of a passing railcar.

20. The method of claim 14 further comprising the step of:
limiting the vertical reaction force imparted by the pivoting member to the wheel to substantially less than one sixty-fourth of an expected lightest weight of a passing railcar.

21. The method of claim 14 further comprising the step of:
limiting the vertical reaction force imparted by the pivoting member to the wheel to substantially less than one-eightieth of an expected lightest weight of a passing railcar.

22. The method of claim 14 wherein the steps of pushing the first and second arms aside comprise the step of:
rotating the first and second contact elements around the ends of the first and second arms, respectively.

23. Apparatus for extracting energy from a passing railcar, the apparatus comprising:
means for using a moving railcar wheel that is traveling along a first rail to push aside laterally away from the rail a first arm of a pivoting member thereby causing a shaft to pivot in a first direction; and
means for using the moving railcar wheel to push aside laterally away from the rail a second arm of a pivoting member thereby causing the shaft to pivot in a second direction, the second direction being different than the first direction.

24. The apparatus as in claim 23 further comprising:
means for minimizing a vertical reaction force imparted to the moving railcar wheel.

25. The apparatus as in claim 23 further comprising:
means for generating and storing electrical power from the rotation of the shaft.

* * * * *